US012454140B2

(12) United States Patent
Scotton et al.

(10) Patent No.: US 12,454,140 B2
(45) Date of Patent: Oct. 28, 2025

(54) METHODS AND SYSTEMS FOR INKJET PAINTING OF SURFACES, ESPECIALLY EXTERIOR AIRCRAFT SURFACES

(71) Applicant: EMBRAER S.A., São José dos Campos (BR)

(72) Inventors: Rogério Scafutto Scotton, São José dos Campos (BR); Fabio dos Santos Da Silva, São José dos Campos (BR); Marcelo Andrey de Albuquerque Bonifácio, São José dos Campos (BR); Flavio Luiz de Oliveira, São José dos Campos (BR); Lília Müller Guerrini, São José dos Campos (BR); Celso Molina, São José dos Campos (BR); Maurício Pinheiro de Oliveira, São José dos Campos (BR)

(73) Assignees: EMBRAER S.A., Sao Jose Dos Campos (BR); UNIVERSIDADE FEDERAL DE SÃO PAULO—UNIFESP, São Paulo (BR)

( * ) Notice: Subject to any disclaimer, the term of this patent is extended or adjusted under 35 U.S.C. 154(b) by 80 days.

(21) Appl. No.: 18/364,036

(22) Filed: Aug. 2, 2023

(65) Prior Publication Data

US 2024/0165966 A1 May 23, 2024

Related U.S. Application Data

(60) Provisional application No. 63/427,233, filed on Nov. 22, 2022.

(51) Int. Cl.
*B41J 11/00* (2006.01)
*B41J 3/407* (2006.01)
(Continued)

(52) U.S. Cl.
CPC ....... *B41J 11/00214* (2021.01); *B41J 3/4073* (2013.01); *B05B 13/0431* (2013.01); *B05D 3/141* (2013.01); *B25J 11/0075* (2013.01)

(58) Field of Classification Search
CPC .. B41J 11/00214; B41J 3/4073; B41J 2/2114; B41J 11/0015; B05B 13/0431;
(Continued)

(56) References Cited

U.S. PATENT DOCUMENTS 4,844,947 A * 7/1989 Kasner .................... B05D 5/06
118/301
9,033,464 B2 5/2015 Kaiba et al.
(Continued)

FOREIGN PATENT DOCUMENTS

WO WO-2017194656 A1 * 11/2017 .......... B41J 11/0015

OTHER PUBLICATIONS

Karl Schuknecht, et al., "Automated Surface Preparation of Embraer's Commercial Jet Fuselage for Painting Process", SAE Technical Paper, Downloaded from SAE International by Rogerio Scotton, published Mar. 19, 2019, 4 pages.
(Continued)

*Primary Examiner* — Justin Seo
(74) *Attorney, Agent, or Firm* — NIXON & VANDERHYE P.C.

(57) ABSTRACT

Methods and systems for painting surfaces (especially vehicle surfaces such as exterior aircraft surfaces) are provided whereby an applied basecoat layer may be treated with plasma (e.g., a non-thermal atmospheric pressure plasma) or laser radiation so as to form a treated basecoat layer which exhibits a decreased contact angle and an increased wetting energy as compared to the contact angle and wetting energy of the basecoat layer which is untreated. At least one inkjet printed color layer may be applied onto the treated basecoat
(Continued)

layer followed by the application of a clearcoat protective layer over the one or more inkjet printed color layers.

13 Claims, 11 Drawing Sheets

(51) Int. Cl.

| | |
|---|---|
| *B05B 13/04* | (2006.01) |
| *B05D 3/14* | (2006.01) |
| *B25J 11/00* | (2006.01) |

(58) Field of Classification Search

CPC ....... B05B 12/00; B05B 12/122; B05D 3/141; B05D 1/02; B05D 7/576; B05D 1/26; B05D 3/067; B05D 2420/00; B25J 11/0075; B64F 5/00

See application file for complete search history.

(56) References Cited

U.S. PATENT DOCUMENTS

| | | | |
|---|---|---|---|
| 10,821,725 B2 | 11/2020 | Pitz et al. | |
| 10,940,698 B2 | 3/2021 | Lewis et al. | |
| 11,534,885 B2 | 12/2022 | Scafutto Scotton et al. | |
| 2019/0262966 A1* | 8/2019 | Scafutto Scotton | B25J 11/0065 |

OTHER PUBLICATIONS

Rogerio S. Scotton, et al., "Evaluation of solvent-based and UV-curing inkjet inks on the adhesion and printing quality of different aircraft surfaces coating", Progress in Organic Coatings, vol. 158, accepted Jun. 14, 2021, 12 pages.

* cited by examiner

METHODS AND SYSTEMS FOR INKJET PAINTING OF SURFACES, ESPECIALLY EXTERIOR AIRCRAFT SURFACES

CROSS-REFERENCE TO RELATED APPLICATION

This application is based on and claims domestic priority benefits of U.S. Provisional Application Ser. No. 63/427,233 filed on Nov. 22, 2022, the entire contents of which are expressly incorporated hereinto by reference.

FIELD

The embodiments disclosed herein relate generally to methods and systems for inkjet painting of surfaces. The embodiments disclosed herein find specific utility in the application of vehicle livery designs and schemes, especially the automated application of aircraft logos and livery by use of non-thermal atmospheric pressure plasma treatment, ultraviolet (UV) light curable inkjet printable paint and digital inkjet printing of at least one-color layer.

BACKGROUND

In general, the use of inkjet systems for large surfaces such as a wall of a building, a plate of a metallic structure or an external surface of a vehicle (e.g., automobiles, trains, trucks and aircraft) may present several technical problems in relation to inkjet ink film adhesion on the surface to be painted, the quality of the image printed and/or the resistance of the coated surface to ultraviolet (UV) rays.

By way of example, in the competitive world of the aircraft industry, the reduction of the operational cost and the quality of the product are decisive factors when companies are undergoing the procurement processes for aircraft sales. Based on these factors, aircraft manufacturers are continually searching for new technologies to improve the product quality. The external appearance of the product is thus an important consideration where the companies are focusing their efforts.

Inkjet technology is an important technology where the companies are looking to improve the painting quality, reduce the solid waste and allow the companies to apply complex logos which may in turn increase revenues by offering services for customized livery when the airlines companies are doing a marketing campaign. Based on the publication on "Progress in Organic Coatings, volume 158, September 2021, 106389—Evaluation of solvent-based and UV-curing inkjet inks on the adhesion and printing quality of different aircraft surfaces coating" (the entire content of which is expressly incorporated hereinto by reference), inkjet ink technologies have the limitation to work on polyurethane paint due to adhesion properties. Based on that the solution, the integration of plasma and inkjet technology to the painting of the exterior of the aircraft parts has been explored. In addition, changing the configuration of painting layers, which results in the reduction of overall paint thickness, and consequently the reduction of aircraft weight, is an attractive possibility. Plasma and inkjet technologies can transform the aerospace industry, as it will be possible to print complex drawings and figures directly onto the fuselage of aircraft, reducing operating costs and increasing the marketing prospects for airline companies.

The competitiveness of the aviation industry is thus a critical factor for the economy and requires new technologies and investments to reduce operating costs, increase production efficiency and to improve product quality. In recent years, with the development of commercial and executive aviation, the demand for more customized aircraft with new materials and new technologies, has increased compared to traditional materials and technologies. Technological progress has opened up great opportunities for the aerospace industry, as the demand for low manufacturing costs, ease of production, safety and passenger comfort have been key factors in the development of production methods.

The use of automated systems in the aerospace industry has increased significantly over the years, resulting in direct solutions and benefits for various companies, as shown, for example, in "SAE Technical Paper 2019-01-1339, 2019, doi:10.4271/2019-01-1339 Automated Surface Preparation of Embraer's Commercial Jet Fuselage for Painting Process" (the entire content of which is expressly incorporated hereinto by reference). The surface preparation of an aircraft fuselage must ensure that the surface is free of dust, oil, grease, oxides, resins, and other potential contaminants before surface painting to avoid common painting problems. Aircraft preparation involves several processes, for example, applying degreaser, scrubbing with an alkaline solution, and washing with acid, each followed by a rinse and a heated drying cycle.

A robotic inkjet printing system that can print graphics and lettering directly onto aircraft fuselages seems very promising, but there are still several drawbacks to meeting aviation requirements, such as print quality, adhesion, and appearance. The main drawback is the low adhesion of inkjet paint, surface energy and the type of inkjet ink used, which usually requires prior surface treatment before printing. However, digital printing technologies for aerospace applications need to be further investigated to meet the quality requirements for outdoor applications. It has been reported that in order to achieve high adhesion of UV-curable inkjet ink to the surface of aircraft, the standard surface should be modified or changed before UV-curable inkjet printing. Adhesion was directly related to the type of surface and the properties of the inkjet ink and the basecoat. The use of a protective clear coat was necessary to give the printed image an appropriate gloss, improve the corrosion resistance and durability of the ink film, but also the successful digital inkjet printer technology to print complex images, logos and lettering to replace conventional aircraft paint.

Based on recent studies and understanding of the limitations of inkjet technology, adhesion science has become the main focus for understanding the material properties associated with interface formation, interface changes over time, and events associated with interface failure. The key principles for good interfacial formation are the creation of a clean surface, the creation of a rough surface for interfacial adhesion, good wetting of the substrate by the adhesive materials, and acceptable curing when phase changes are required for final bond formation.

Plasma treatment is a proven method for surface modification and coating of a wide range of materials. It has been used particularly successfully for polymers, as it allows the surface to be treated without affecting the properties of the bulk. Apparently, the energy of the active species in the plasma is such that the penetration depth into most polymer materials is only on the order of a around 100 nm changing surface free energy. The low surface free energy limits the application due to poor adhesiveness and low wettability, but the combination of inkjet and plasma technology seems to be the best option to enable full implementation in the aerospace industry.

It would therefore be highly desirable if systems and methods, especially automated systems and methods, could be provided that would allow the simultaneous application of plasma, inkjet painting and ultraviolet (UV) light exposure for painting a variety of surfaces, e.g., the application of livery paint schemes to external aircraft surfaces. It is towards fulfilling such a need that the embodiments disclosed herein are directed.

SUMMARY

In general, the embodiments disclosed herein are directed toward methods and systems for painting surfaces (especially vehicle surfaces such as exterior aircraft surfaces) by applying a basecoat layer to the surface, treating the basecoat layer to plasma or laser radiation; applying at least one inkjet printed color layer onto the treated basecoat layer, and applying a clearcoat layer over the one or more inkjet printed color layers. The plasma treatment by be practiced using a non-thermal atmospheric pressure plasma which forms a plasma-treated basecoat layer exhibiting a decreased contact angle and an increased wetting energy as compared to the contact angle and wetting energy of the basecoat layer which is untreated by the plasma. Alternatively, the basecoat layer may be treated by using an end effector that provides laser radiation to the basecoat layer. Such laser radiation may be a green-light laser having a wavelength of about 532 nm, an ultraviolet laser having a wavelength of about 10 to 400 nm, or a CO2 laser having a wavelength of approximately 10.6 micrometers (μm), which falls within the far-infrared region of the electromagnetic spectrum.

At least one inkjet printed color layer may be formed by inkjet printing of an ultraviolet (UV) curable inkjet printable paint. The application of the UV curable inkjet printable paint by inkjet printing may be simultaneously exposed to UV light to at least partially cure the inkjet printable paint and thereby form the at least one inkjet printed color layer.

A preferred method for painting an exterior surface of a vehicle includes the steps of:

(a) surface preparation (cleaning);

(b) applying an epoxy primer layer onto the exterior surface of the vehicle;

(c) applying a basecoat layer onto the exterior surface of the vehicle;

(d) positioning a robotic assembly comprising an end effector which includes at least one plasma applicator, one or more inkjet printhead and an ultraviolet (UV) light system adjacent to the basecoat layer applied to the exterior surface of the vehicle;

(e) operating the robotic assembly so as to perform the steps of:

(i) treating the basecoat layer with a plasma by operating the plasma applicator operably associated with the end effector thereof to generate a plasma directed toward the basecoat layer;

(ii) applying at least one color layer onto the plasma treated basecoat layer by inkjet printing an ultraviolet (UV) light curable inkjet printable paint by operating the inkjet printhead operably associated with the end effector of the robotic assembly; and (iii) exposing the at least one color layer to UV light by operating the UV light system operably associated with the end effector of the robotic assembly to at least partially cure the inkjet printable paint forming the at least one color layer; and (f) applying a clear coat layer onto the exterior surface of the vehicle.

The steps (e)(ii) and (e)(iii) may be practiced simultaneously. The step (e)(i) may be practiced by treating the basecoat layer with a non-thermal atmospheric pressure plasma. The steps (b) (c) (f) may be practiced by applying the epoxy primer, basecoat and clear coat layer using a separate robotic assembly. The step (d) may be practiced by the steps of (d1) mounting the robotic assembly on rectilinear track adjacent to the exterior surface; and (b2) operating the robotic assembly and moving an automated guided vehicle (AGV) so as to perform steps (e)(i)-(e)(iii) until the exterior surface of the vehicle is painted.

Automated systems for painting an exterior surface of a vehicle are also provided. In accordance with preferred embodiments, the automated systems will include a robotic coating assembly for applying a epoxy primer, base coat and clear coat to a surface of the vehicle, a color-printing robotic assembly having an end effector which includes at least one plasma applicator, one or more inkjet printhead and an ultraviolet (UV) light system, and a controller operably connected to the robotic coating assembly and the color-printing robotic assembly. The controller is operable so as to responsively cause (i) the robotic coating assembly to apply an epoxy primer, basecoat and clear coat layer onto the exterior surface of the vehicle; (ii) the plasma applicator assembly operably associated with the end effector of the color-printing robotic assembly to treat the basecoat layer with a plasma generated by the plasma applicator assembly; (iii) at least one color layer to be applied onto the plasma treated basecoat layer by inkjet printing of an ultraviolet (UV) light curable inkjet printable paint through operation of the inkjet printhead operably associated with the end effector of the robotic assembly; and (iv) the at least one color layer to be exposed to UV light by operating the UV light system operably associated with the end effector of the robotic assembly to at least partially cure the inkjet printable paint forming the at least one color layer.

An automated guided vehicle (AGV) may be operably connected to the controller, wherein at least the color-printing robotic assembly is mounted to and carried by the AGV. Alternatively, or additionally, the automated system may be provided with a painting booth for housing the vehicle and at least one rectilinear track adjacent to the exterior surface of the vehicle within the painting booth. Carriages are operably mounted to the rectilinear track and respectively carry the robotic coating assembly and the color-printing robotic assembly to allow rectilinear movements thereof adjacent to the exterior surface of the vehicle. The robotic coating assembly may comprise a rotatable bell applicator nozzle system.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 4:
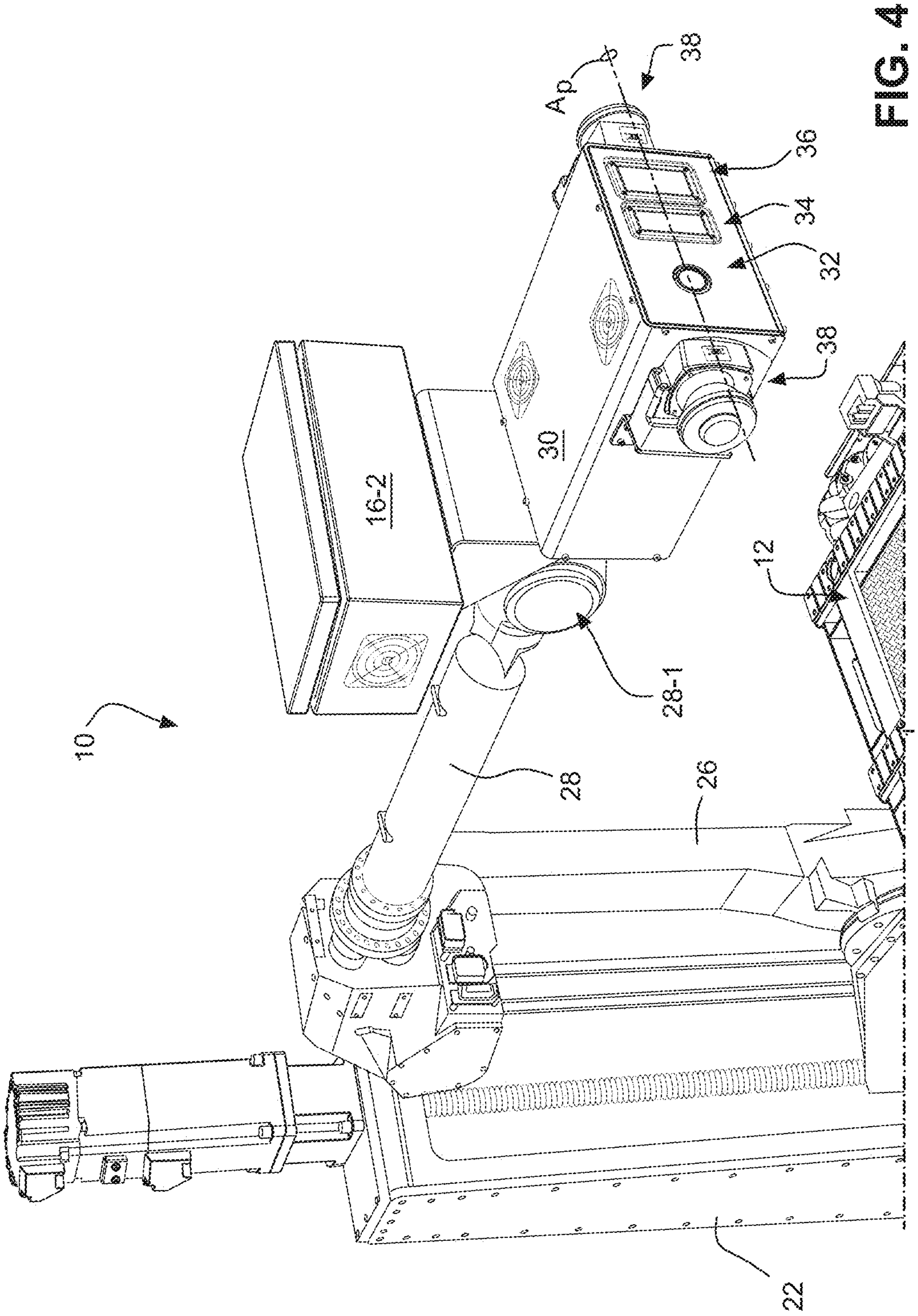
FIG. 4 is an enlarged partial perspective view of the robotic assembly employed in the embodiment of FIG. 2 and the end-effector thereof.
Figure 6A:
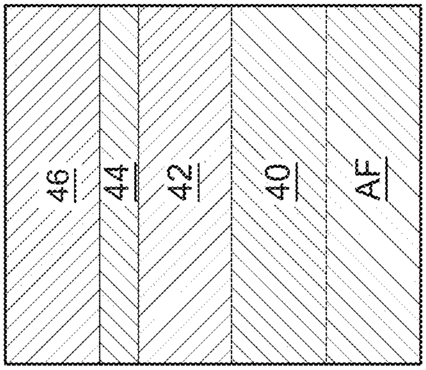
Figure 6B:
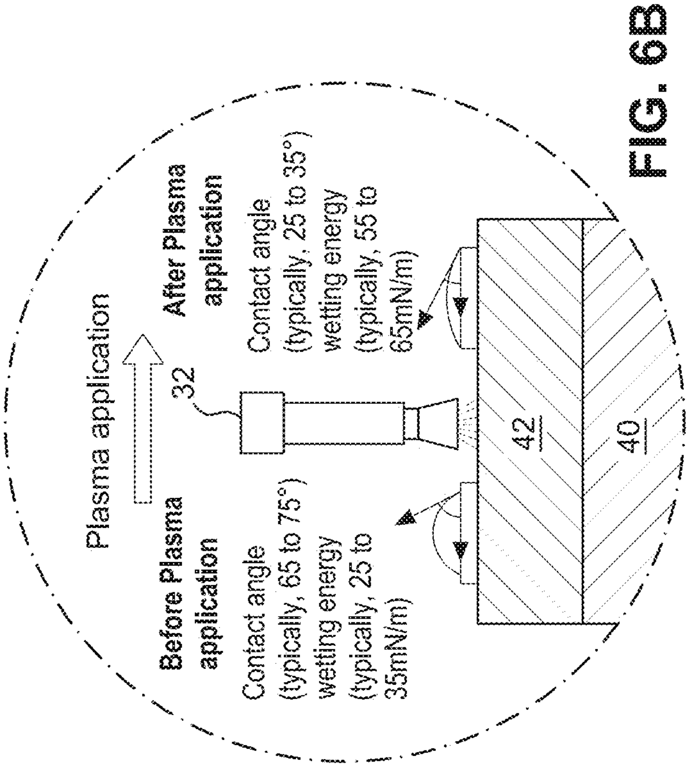
Figure 5:
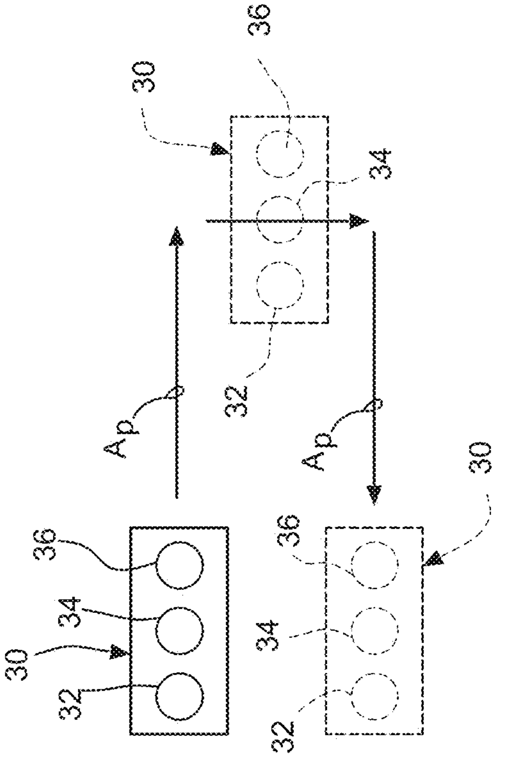
Figure 7:
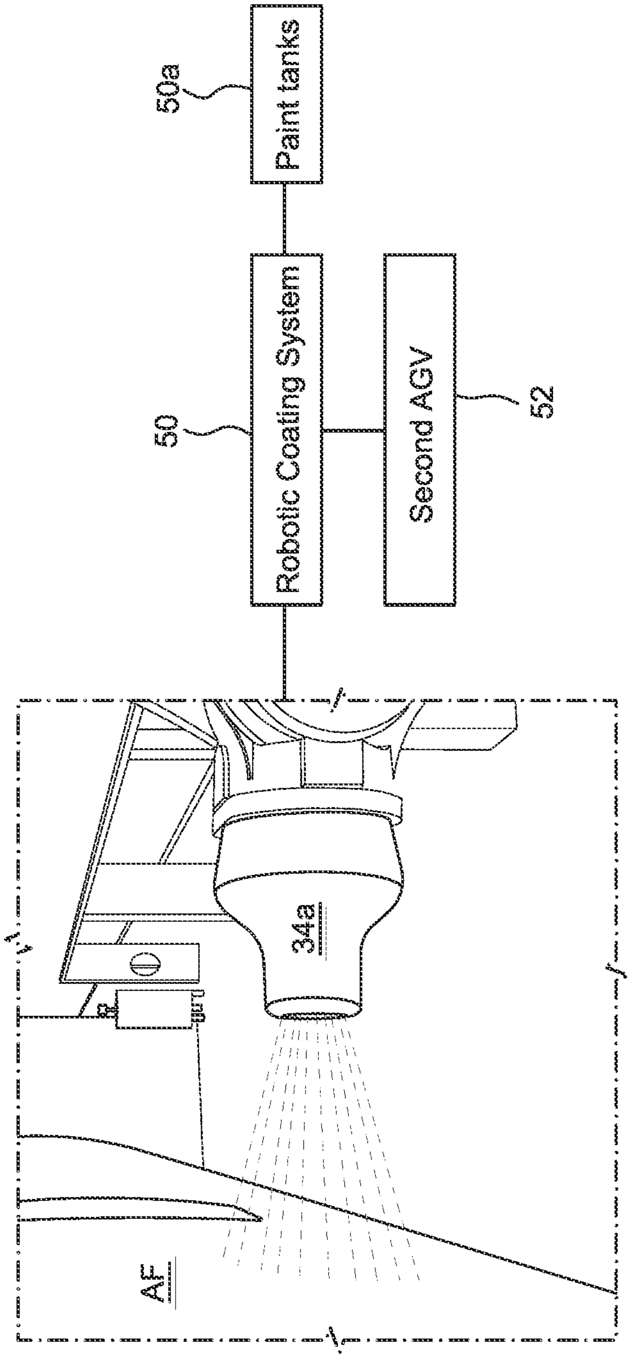
Figure 8:
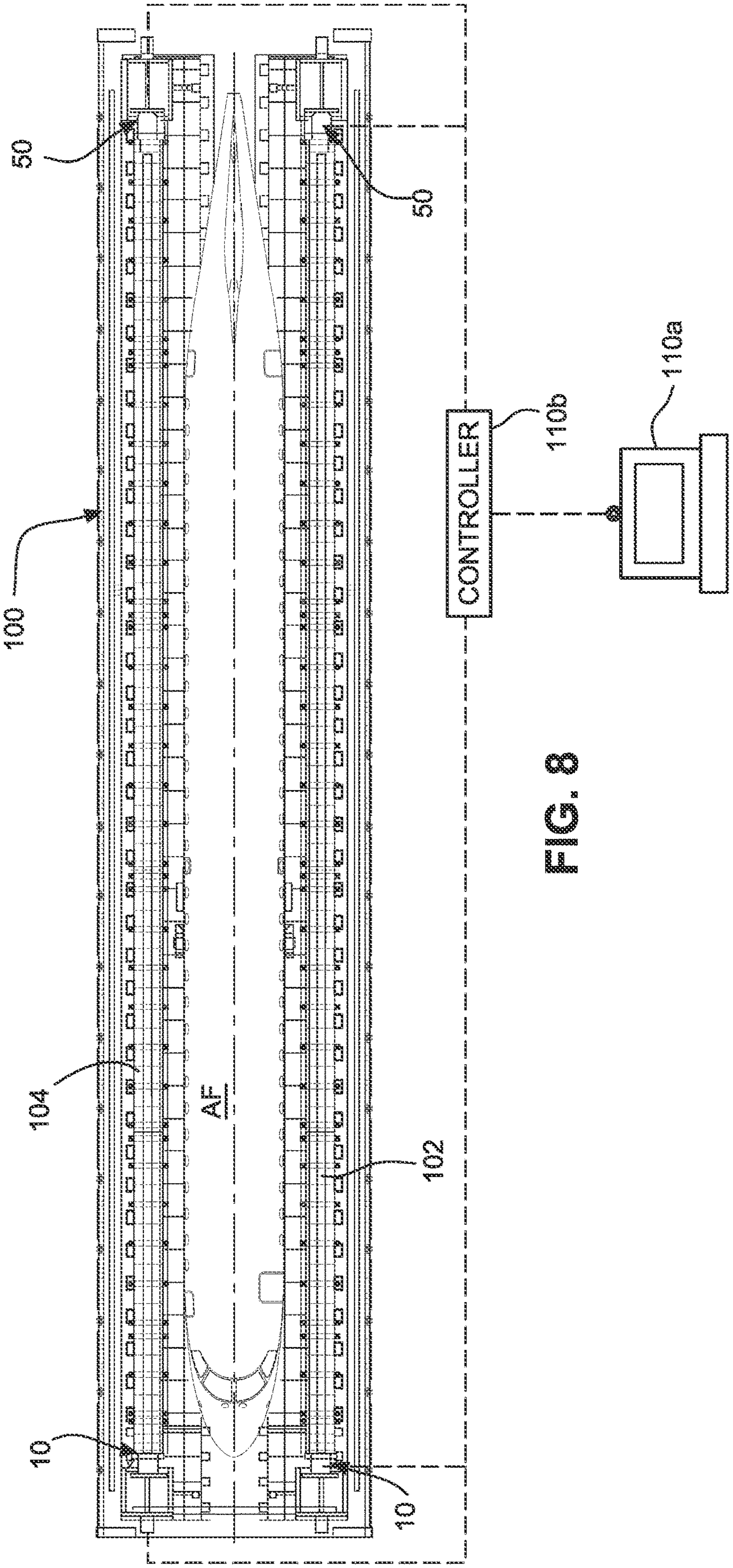
Figure 9:
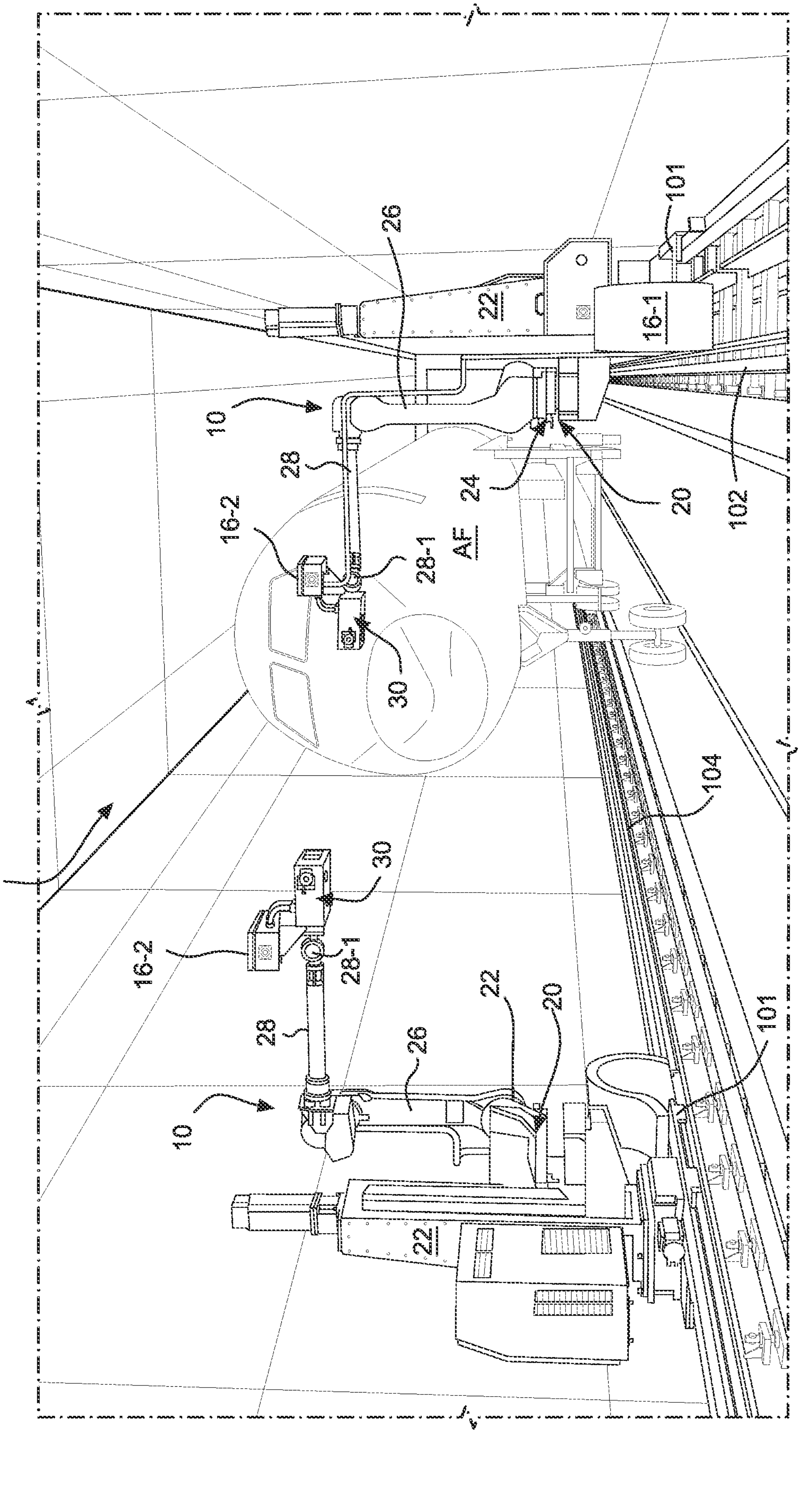
Figure 10:
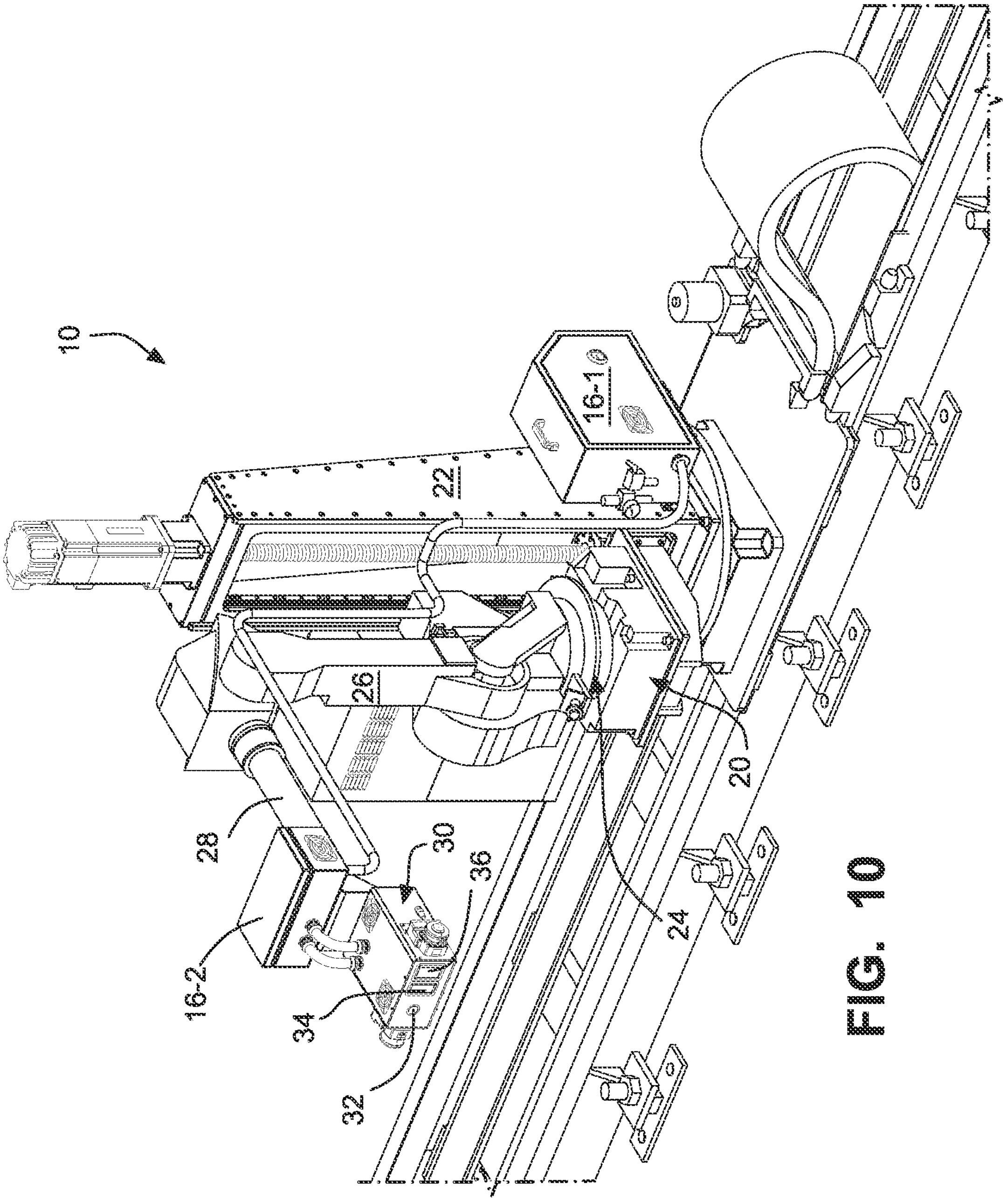
Figure 11:
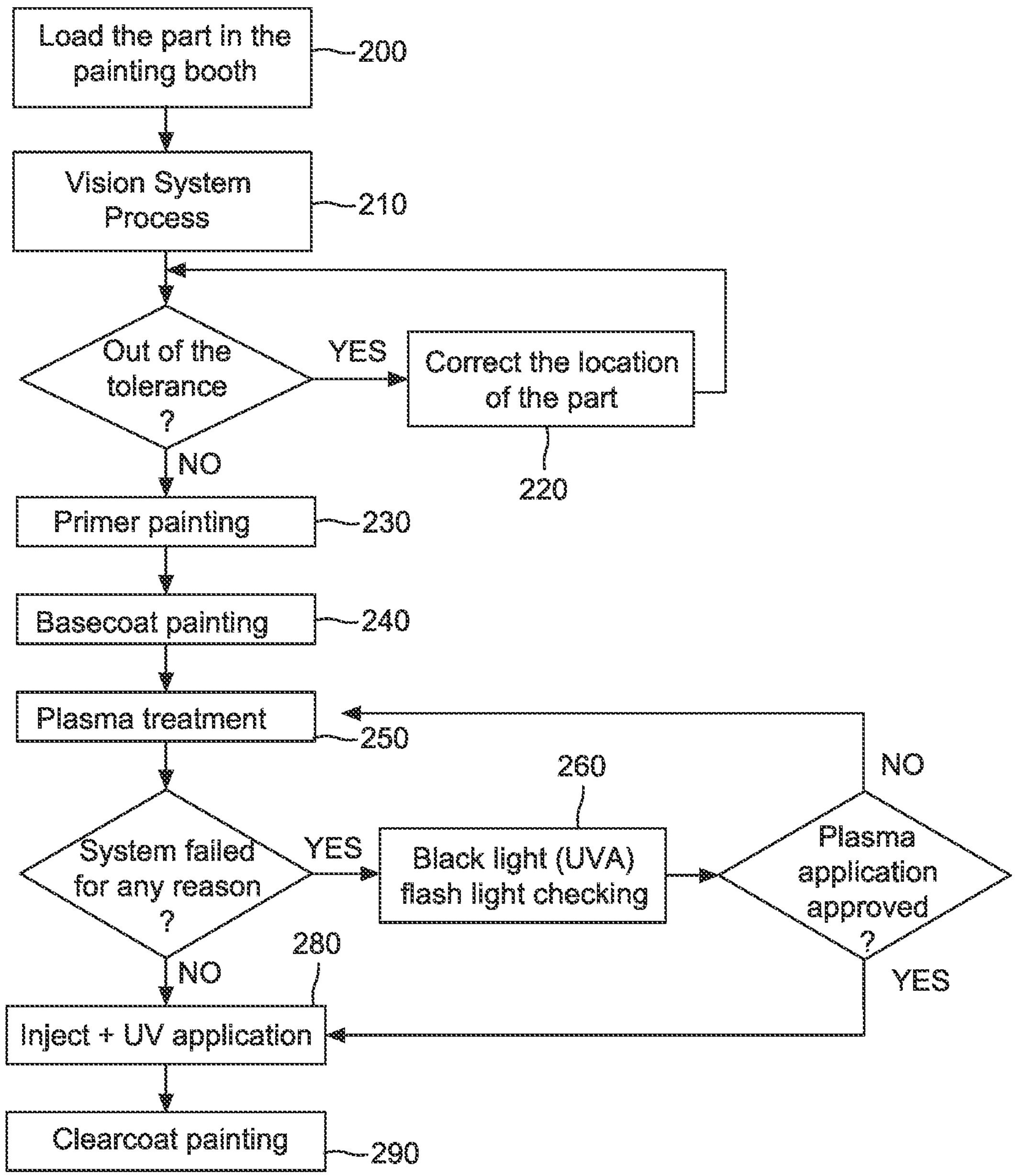

FIG. 5 schematically depicts the movement of the end-effector relative to the surface of the substrate being painted;

FIG. 6A is a schematic view of a paint layer configuration that may be applied onto the substrate surface by the end-effector shown in FIG. 4;

FIG. 6B is an enlarged schematic view showing a non-thermal atmospheric pressure plasma modification of the inkjet printed layers;

FIG. 7 is an enlarged perspective view of an exemplary bell nozzle applicator system;

FIG. 8 is an illustration of another embodiment of an automated system in accordance with the invention showing a top plan view of an aircraft within a paint application booth having multiple robotic assemblies fixed to a longitudinally aligned track system for reciprocal movements relative to the longitudinal axis of the aircraft fuselage;

FIG. 9 is a perspective view of the application booth and robotic assemblies employed with the embodiment shown in FIG. 8;

FIG. 10 is a perspective view of an exemplary robotic assembly that may be employed with the embodiment shown in FIG. 8; and FIG. 11 is a flow chart of the processing that may be accomplished using the system shown in FIG. 8.

DETAILED DESCRIPTION OF EMBODIMENTS

Figure 1:
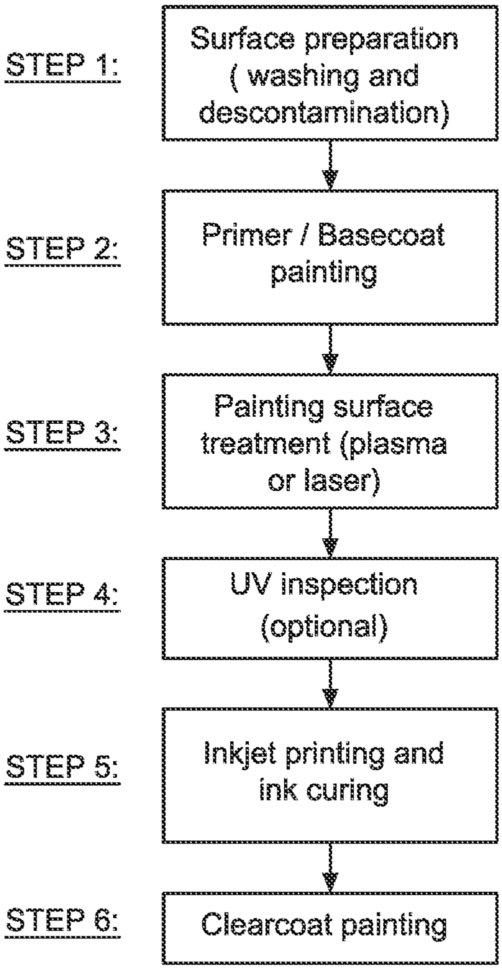
FIG. 1 is a flow chart that is representative of an embodiment of a general method for surface application of inkjet printed coatings in accordance with the present invention.

The general objective of the embodiments described herein is to present an inkjet painting method and system that can be applied in various sectors of industry, such as the automotive industry and the aeronautical industry. Such a method is schematically depicted in FIG. 1 as comprising the following steps:

- Step 1: a surface preparation step is conducted whereby the surface of the substrate may be washed and/or decontaminated,
- Step 2: an epoxy primer/polyurethane resin (PUR) basecoat painting step is conducted whereby an epoxy primer layer is applied onto the substrate surface followed by the application of a PUR basecoat layer onto the primer layer,
- Step 3: a painting surface treatment step is accomplished by subjecting the basecoat layer to plasma or laser treatments,
- Step 4: an UV inspection step is conducted whereby the treated painting surface is checked for deficiencies by UV radiation;
- Step 5: an inkjet printing step is conducted whereby one or more layers of inkjet printed paint is applied onto the surface treated base coat and allowed to cure (e.g., by subjecting the inkjet printed paint to UV radiation); and
- Step 6: a clearcoat application step is conducted which applies a clearcoat layer over the inkjet printed and cured layer(s).

An exemplary non-limiting embodiment of the invention described herein is a painting system that provides a final finishing according to aeronautical quality standards. For this purpose, an ultraviolet inkjet ink technology is employed together with a polyurethane painting system compatible with such ink to provide the quality of an aircraft final finishing. To guarantee the proper adhesion of the layers, a novel plasma treatment system is employed as will be described hereinbelow. The innovative process and systems employed in the embodiments of the invention as described further herein enable the automated painting of an aircraft's external surfaces, including an aircraft's fuselage, vertical stabilizer and/or rudder, in a single booth capable of performing all the steps for the painting, i.e., all the operations are performed in a single location and are completely automated.

The technology to treat the basecoat to modify the surface is most preferably a non-thermal atmospheric pressure plasma, that can use air, nitrogen, oxygen, argon and/or helium as the plasma gas. Also, the use of laser technology is envisioned to treat the surface of the basecoat. For example, green-light lasers having a typical wavelength of about 532 nm, ultraviolet lasers having a typical wavelength of about 10 to 400 nm and $CO_2$ lasers having a typical wavelength of about 10.6 micrometers (μm) may satisfactorily be employed.

Figure 2:
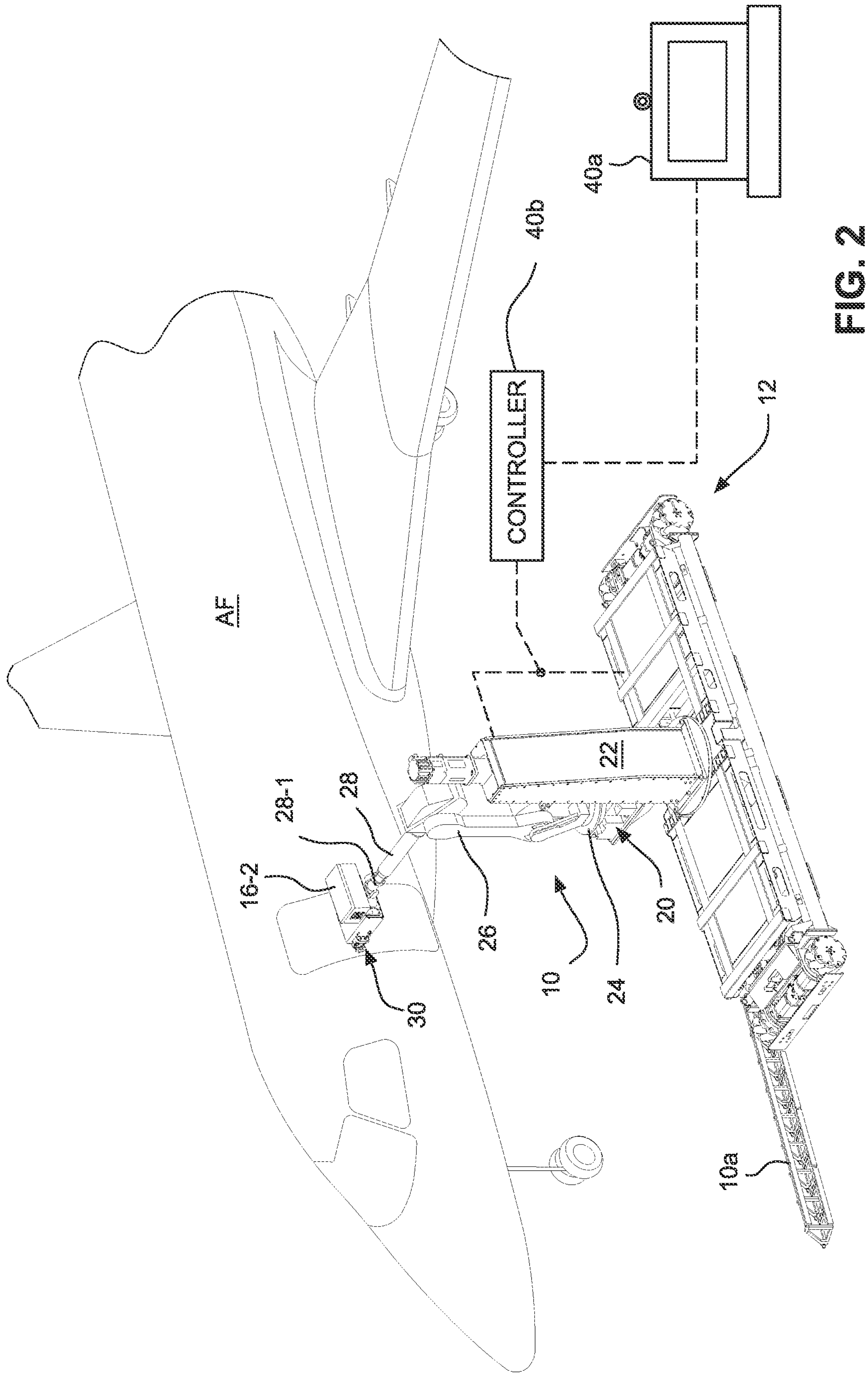
FIG. 2 is a perspective view of one embodiment for painting exterior surfaces of an aircraft utilizing a robotic assembly moveable relative to such exterior surfaces via an automated guided vehicle (AGV)
Figure 3:
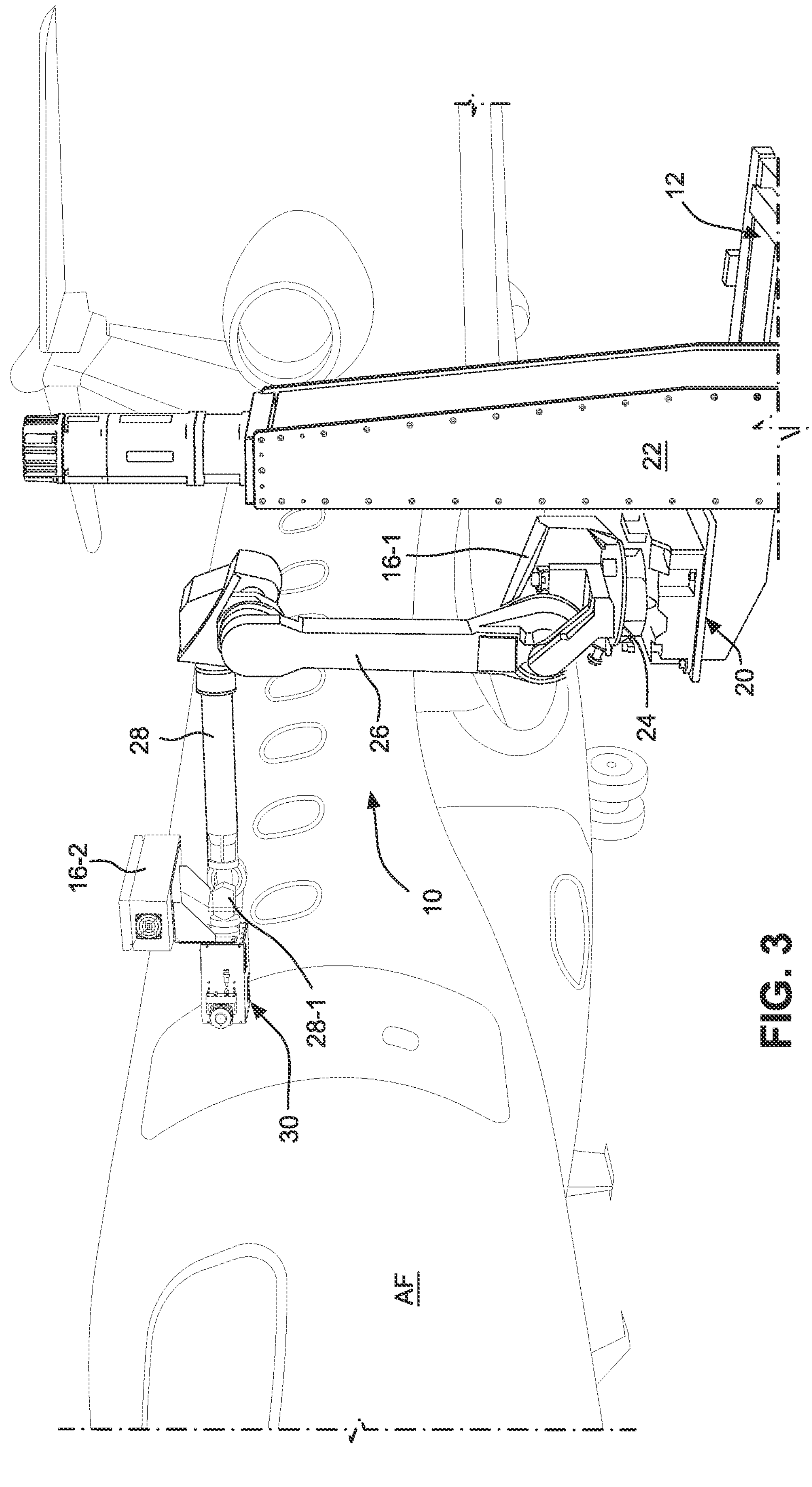
FIG. 3 is an enlarged perspective view of the robotic assembly embodiment shown in FIG. 2 positioned adjacent to a section of the aircraft fuselage.

As is shown in FIG. 2, an exemplary color printing robotic assembly 10 is employed which is mounted on and carried by the AGV 12 so as to be capable of being moved about the exterior of the aircraft fuselage AF to allow the exterior surfaces thereof to be painted with the desired logo and/or livery of the aircraft customer. A guided system or bumper 10*a* may be used for the movement of the AGV 12 close to the aircraft fuselage AF to avoid any collision. When the bumper 10*a* is employed, the AGV 12 may then be considered to be a rail guided vehicle RGV.

The robotic assembly 10 includes a platform 20 that is operatively coupled to the pedestal 22 for reciprocal vertical movements along the z-axis defined by the pedestal 22. The platform 20 carries a robotic swivel base assembly 24 operatively connected to a proximal end of the upper arm assembly 26 to allow pivotal movements therebetween. The distal end of the upper arm assembly 26 is in turn pivotally connected to the proximal end of the forearm assembly 28. A wrist assembly 28-1 is rotatably provided at the terminal end of the forearm assembly 28 and is connected to the end effector 30. One robotic assembly 10 that may suitably be employed in the practice of the embodiments disclosed herein is described more fully in U.S. Pat. No. 11,534,885 (the entire contents of which are expressly incorporated hereinto by reference).

The end effector 30 is especially adapted to accomplish the functions to be described in greater detail below. In especially preferred embodiments, the end effector 30 will be provided with an atmospheric pressure plasma applicator 32, one or more inkjet printheads 34 and an ultraviolet (UV) light system 36 in linear alignment with one another along a pixelation axis Ap (see FIGS. 4 and 5). A combined proximity sensor/video system 38 is in operative association with the end effector 30. The non-thermal atmospheric pressure plasma applicator 32 provides chemical and physical surface modification (oxidation and chain molecule decay and torsion) by penetrating deep into the pre-applied polyurethane resin (PUR) basecoat layer so as to reduce the contact angle of the inkjet printed paint applied thereon and increase the wetting energy, ensuring proper adhesion for inkjet ink pickup. The plasma generated by the applicator 32 preferably is formed by a sufficiently high pulsed voltage capable of breaking the electrical air constant and creating ionized compressed air.

Figure 4A:
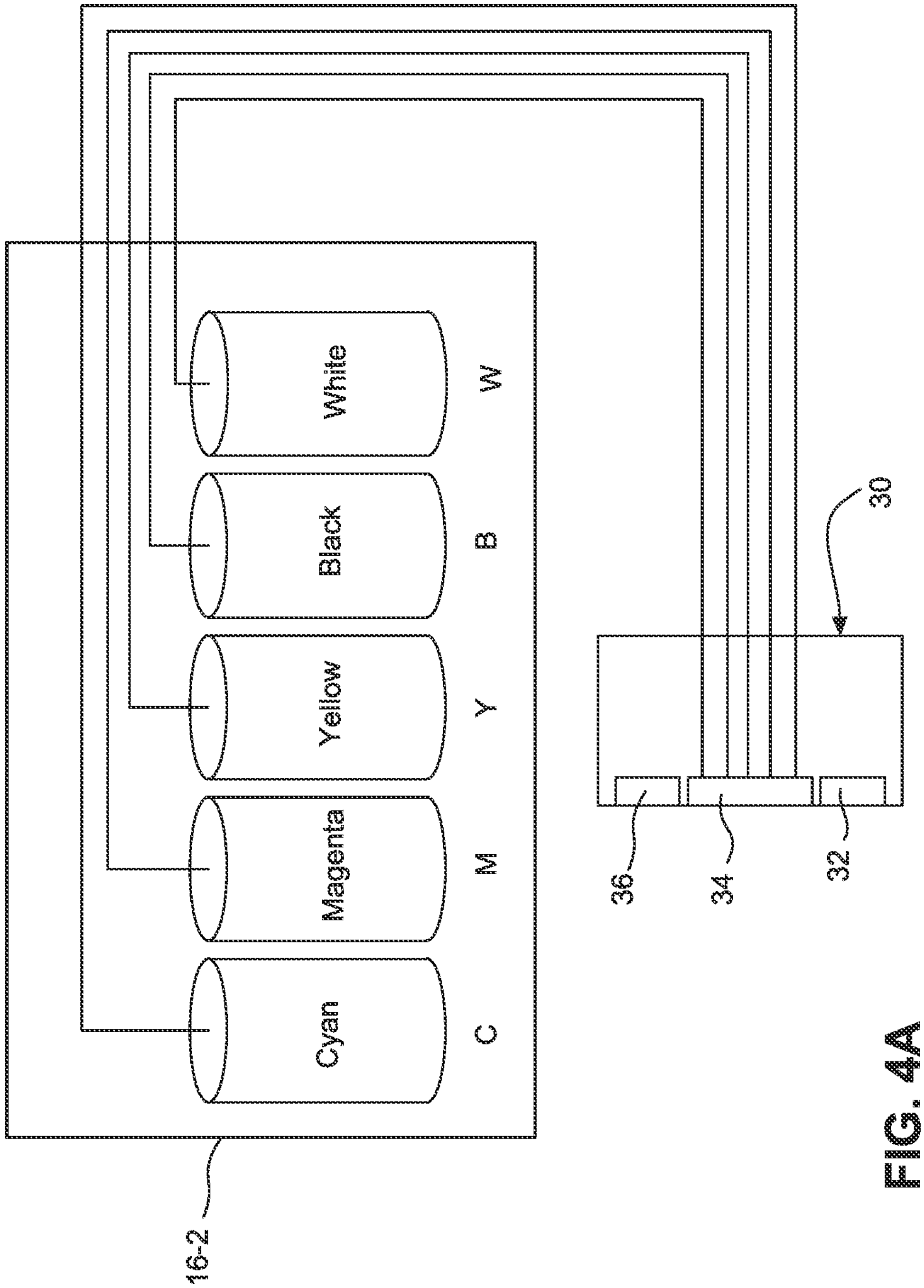
FIG. 4A is a schematic diagram of the ink tank system that may be employed in operative association with the inkjet printhead of the end-effector.

The end effector 30 is also provided with one or more inkjet printheads 34 which function to inkjet print the ink paint according to a predetermined software design stored in the controller memory. In operation, the inkjet printhead 34 will receive the ink from the ink tanks 16-1, 16-2 located at the base 24 of the robotic assembly 10 or carried by the end-effector 30, respectively. As is schematically shown in FIG. 4A, the ink tank system 16-1 mounted on the robot base 24 and/or the ink tank system 16-2 carried by the end-effector 30 will typically contain the primary ink colors of cyan (C), magenta (M), yellow (Y), black (K) and white (W) for the application of specialized colors required for the livery application to the aircraft fuselage AF surface. According to the embodiments disclosed herein, the CMYK ink color system uses a subtractive process to create colors. The background (or canvas) is white color. When printing on a colored background other than white, the colors produced by the CMYK inks can be affected. In such cases, the white ink color is used together with CMYK system printing application.

The end effector 30 is also provided with an ultraviolet (UV) system 36 which provides the UV curing radiation simultaneously with the application of the inkjet paint via the printhead 34. The UV curing by the UV system 36 will preferably achieve about 80 to 90% of the total cure for the inkjet printed coatings applied by the printhead 34.

An operator input/control console 40*a* may be provided to allow an operator to visually follow the operations of the robotic assembly 10 and AGV 12 via the video system 38 (see FIG. 4). The operator control console 40*a* may suitably include a touch screen display that allows an operator to interact with a processor therein and thus control the robotic assembly 10 and AGV via signal outputs from an interfaced controller 40*b*. The touch screen display suitably presents graphical user interface components (not shown) for allowing the user to, for example, control the systems associated with the end effector 30; control the location of the robotic assembly 10 and its associated AGV 12 relative to the aircraft fuselage AF surface; control the action of the robotic assembly 10 and AGV 12, e.g., select an automated process, send the robotic assembly 10 and AGV 12 to a safe "pause" position, control and vie the speed of the robotic assembly 10 and/or AGV 12; and/or check the real time status of the process.

As is shown in FIG. 5, the application process using the end-effector 30 is performed in a substantially horizontal line-by-line (pixelated) application technique by following the substrate surface (e.g., the aircraft fuselage AF) sequentially along respective pixelation axes Ap while maintaining the proper separation distance from the surface. The proper separation distance from the surface is achieved by virtue of the proximity sensors 38 communicating with the controller 40*b* which responsively controls the robotic assembly 10 and/or the AGV 12 so as to adjust the distance between the surface and the effector 30.

The coating on the aircraft surface AF is schematically shown in FIG. 6A as being comprised of an initial epoxy primer layer 40 (having a typical thickness of between about 12 to about 25 μm), and a polyurethane resin (PUR) basecoat layer 42 (having a typical thickness of between about 50 to about 65 μm) applied on top of the primer layer 40. An inkjet printed colored paint layer 44 is then applied over the PUR basecoat layer 42 via the inkjet printhead 34 associated with the end effector 30. The inkjet printhead 34 has the ability to print in the color layer 44 all of the required color in only one pass. As noted previously, when printing on a colored background other than white, the colors produced by the CMYK inks can be affected. In such cases, the white ink color is used together with the CMYK ink system for printing the layer 44.

Once all of the inkjet printed color layers 44 are applied (as will be described in greater detail below with reference to FIG. 6A), a clearcoat layer 46 (having a typical thickness of between about 50 to about 65 μm) will be applied so as to cover the inkjet printed color layers 44. The embodiments of the present invention involve modifying the base coat layer 42 and the inkjet printed color layers 44 such that the latter are present as a color layer between the polyurethane basecoat layer 42 and the clearcoat layer 46. In such a manner, therefore, the basecoat layer 42 will serve as the base for the color layer formed of the inkjet printed color layers 44 while the clearcoat layer 46 provides protection against environmental effects, ultraviolet effects and the like.

A bell nozzle system 34*a* (see FIG. 7) may be associated with a robotic coating assembly (schematically identified in FIG. 7 by reference numeral 50) associated with a separate AGV 52 to apply the epoxy primer layer 40, the polyurethane resin (PUR) basecoat layer 42 and the clearcoat layer 46 (see FIG. 6A). The bell nozzle system 34*a* may for example be capable of high-speed rotation (e.g., at about 80,000 RPM) so as to atomize and break up the polyurethane (PUR) paint to obtain a very smooth coat and reduce overspray during painting. The paints are loaded into one suitable tanks 50*a* located at the base of the robotic coating assembly 50 and/or carried by the AGV 52. After the application of the last coat, new fresh paint is loaded into the tanks 50*a* to maintain proper paint viscosity.

As is shown in the enlarged schematic view of FIG. 6B, the basecoat layer 42 is preferably subjected to a nonthermal (cold) atmospheric pressure plasma via the plasma applicator 32 associated with the end effector 30. The plasma treatment of the base coat 42 has the function to substantially increase the wetting energy of the basecoat layer 42, e.g., from about 25-35 mN/m to about 55-65 mN/m. Such an increased wetting energy thereby allows for the proper adhesion of the inkjet printed color layer 44 to the basecoat layer 42 thereby resulting in a resistant bond between the PUR basecoat layer 42 and the inkjet printed paint layers 44.

Following the surface treatment of the PUR basecoat layer 42 with atmospheric pressure non-thermal (cold) plasma applied via the plasma applicator 32 associated with the end effector 30, the inkjet printed paint layer 44 (which is formed from UV curable inkjet printable paint) is at least partially cured (polymerized) by irradiation with ultraviolet (UV) light from the UV system 36 associated with the end effector 30. In preferred forms, the plasma treatment of the surface of the basecoat 42, the application of the inkjet printed color layer(s) 44 and the application of UV light to such layer(s) 44 for the purpose of at least partially curing (polymerizing) the same are preformed sequentially by repeated sequential tracing of a path as shown in FIG. 6. However, the application of the inkjet printed color layer(s) 44 and the application of UV light to such layer(s) 44 for the purpose of at least partially curing (polymerizing) the same may be performed substantially simultaneously after the basecoat layer 42 has been treated with the nonthermal plasma.

The procedures noted above may also be performed utilizing a laser treatment of the basecoat layer 42, e.g., green-light lasers having a typical wavelength of about 532 nm and/or ultraviolet lasers having a typical wavelength of about 10 to about 400 nm and/or CO2 lasers having a typical wavelength of about 10.6 micrometers (μm) may satisfactorily be employed instead of the nonthermal atmospheric pressure plasma. Suffice it to say if laser treatment is employed then the plasma applicator 32 associated with the end effector 30 is replaced with a suitable laser light projecting system.

A fully automated process according to another embodiment of the invention is shown in FIGS. 8-10. As shown, the process may be performed in an elongated painting booth 100 which is sized and configured to accept therewithin the aircraft fuselage AF. The painting booth 100 will include pairs of the anthropomorphic first and second robotic assemblies 10, 50 as previously described which are respectively mounted to similar carriages 101 (see FIG. 9) operatively moveable on parallel rails 102 and 104 positioned on the port and starboard sides of the aircraft fuselage AF, respectively. As such, each of the robotic assemblies 10, 50 is capable of being rectilinearly traversed back and forth along the respective port and starboard sides of the aircraft fuselage AF.

To increase paint transfer efficiency, the aircraft fuselage AF is grounded and the second robotic assemblies 50 use the bell system 34*a* as shown in FIG. 7 rotating at about 80,000 RPM, to atomize and break up the polyurethane (PUR) paint to obtain a very smooth basecoat layer 42 over a previously applied epoxy primer layer 40 thereby reducing overspray during painting and then used to paint the clear coat 46 over the inkjet layer.

The movement of the robotic assemblies 10, 50 may be choreographed by the computer-controlled software stored in the computer control station 110*a* which communicates with the controller 110*b* so as to reach all external surface regions of the aircraft fuselage AF positioned within the painting booth 100 (FIG. 8). Specifically, the robotic assemblies 10, 50 are operably responsive to command signals generated by preprogrammed offline software stored in a non-volatile memory of a computer control station 110*a* operatively connected to the controller 110*b*. The computer control station 110*a* is thus capable of generating all paths and data for operation of the robotic assemblies 10, 50 using a 3D model of the aircraft fuselage AF based on operator input. In this way all planning and operation of the robotic assemblies 10, 50 may be defined in an offline 3D environment that allows for improvement in each step of the process.

The control station 110*a* will suitably include a touch screen display that allows a user to interact with a processor therein and thus control the robots. The touch screen display suitably presents graphical user interface components (not shown) which by way of example allow the user to:

a) Control the application system;

b) Control location of the robot base on the track;

c) Control the action of the robots; select an automated process; send the robot to a safe "pause" position; control & view the speed of the robots; and control & view robot pressure;

d) Check the real time status of the process;

e) Check the status of the alarm fences; and f) Provide a safety fence which surrounds the work booth, i.e., by providing sensors at each door of the safety fence, for detecting intrusion into the work booth. If any of the sensors detect human intrusion, a shut-off signal is sent directly to the robot controller and the system stops immediately.

A more detailed exemplary flow chart sequence of the processing steps in accordance with the embodiment of the automated system depicted in FIGS. 8-10 is shown in accompanying FIG. 11. Specifically, as shown such an automated system may include the following steps.

The aircraft fuselage AF (or any other part to be painted) is initially moved in step 200 (FIG. 11) into the painting booth 100. Thereafter in step 210, the vision system 38 associated with the robotic assemblies 10, 50 performs positional correction of the fuselage AF within the interior space of the painting booth 100 which automatically generates the offsets of the offline programming paths, i.e., the variation of the fuselage AF in all directions roll, pitch and yaw which are properly modified to avoid any collision with the robotic assemblies 10, 50. If the location of the aircraft fuselage AF is out of the tolerance, it is then relocated by step 220 within the painting booth 100 with the vision system 38 being operated again until the confirmation is obtained that the aircraft fuselage AF is properly positioned.

Once the aircraft fuselage AF is properly positioned within the painting booth 100, a solvent-based epoxy primer paint is applied in step 230 using the bell system 34*a* associated with the robotics assembly 50. The application of the primer paint creates a primer paint layer 40 which covers the entire surface of the fuselage AF and provides a very smooth layer. Solvent flash-off begins as soon as the primer paint is applied. Thereafter, the primer paint may be fully cured by heating the interior of the painting booth 100.

A solvent based polyurethane resin (PUR) base paint is applied by the bell system 34*a* of the robotics assembly 50 in step 240 so as to cover the entire surface of the previously applied primer layer 40 and thereby provide a smooth basecoat layer 42 for accepting the inkjet printed paint layer 44. Solvent flash-off begins as soon as the primer paint is applied. Thereafter, the primer paint may be fully cured by heating the interior of the painting booth 100.

The vision image data collected by the controller 110*b* e.g., via the proximity sensor/video system 38 associated with the robotic assembly 10, may be transferred to the end effector 30 so allow the robotic assembly 10 to perform the surface treatment of the basecoat layer 42 using e.g., non-thermal atmospheric pressure plasma emitted by the plasma applicator 32. The plasma treated surface of the basecoat layer 42 will thereby enable the application via inkjet printing of the prestored logo or livery according to the customer's specification and thus provides a surface with the proper wettability energy to receive the inkjet printed paint to form the layer(s) 44.

If the automated system fails during the plasma application a black light (UVA) flashlight may be used in step 260 to inspect if the plasma application was applied correctly on the surface of the basecoat layer 42. The black light may be provided as a component part of the end-effector 30 or may be a portable hand-held unit which an operator may use.

If the plasma application is determined to be acceptable after the UVA inspection, the process then proceed to the next step 280 whereby the inkjet printing application of a UV curable inkjet paint is carried out through the inkjet printhead 34 of the inkjet system located in the end effector 30. Manipulation of the end effector 30 mounted on the robotic assembly 10 thereby enables the application of the logo and color livery according to the customer's specifications. Curing of the inkjet paint may be carried out simultaneously by operation of the UV system 36 operably associated with the end effector 30 of the robotic assembly 10. The proximity sensor/video system 38 associated with the robotic assembly 10 is on the end effector 30 to maintain a precise distance between the inkjet printhead 34 and the surface of the basecoat layer 42 or previously applied inkjet layer 44.

A solvent based clearcoat paint may then be applied in step 290 using the bell system 34*a* associated with the robotic assemblies 50 so as to cover the entire surface of the painted aircraft fuselage to form the clearcoat layer 46 and thereby provide a gloss layer and protection for the inkjet printed color layer(s) 44 against ultraviolet radiation. Solvent flash-off of the clearcoat paint begins as soon as the paint is applied. Thereafter, the primer paint may be fully cured by heating the interior of the painting booth 100.

While reference has been made to particular embodiments of the invention, various modifications within the skill of those in the art may be envisioned. Therefore, it is to be understood that the invention is not to be limited to the disclosed embodiments, but on the contrary, is intended to cover various modifications and equivalent arrangements included within the spirit and scope thereof.

What is claimed is:

1. A method for painting an exterior surface of a vehicle which comprises the steps of:

(a) applying a basecoat layer onto the exterior surface of the vehicle;

(b) positioning a robotic assembly adjacent to the basecoat layer applied to the exterior surface of the vehicle according to step (a), the robotic assembly comprising an end effector including a plasma applicator, one or more inkjet printheads and an ultraviolet (UV) light system which are linearly aligned with one another along a pixelation axis; and (c) operating the robotic assembly by moving the end effector along the pixelation axis so as to perform the sequential steps of:

(i) treating the basecoat layer with a plasma by operating the plasma applicator operably associated with the end effector thereof to generate a plasma directed toward the basecoat layer and form a plasma treated basecoat layer along the pixelation axis;

(ii) applying at least one color layer onto the plasma treated basecoat layer by inkjet printing an ultraviolet (UV) light curable inkjet printable paint along the pixelation axis by operating the one or more inkjet printheads operably associated with the end effector of the robotic assembly; and (iii) exposing the at least one color layer applied along the pixelation axis to UV light by operating the UV light system operably associated with the end effector of the robotic assembly to at least partially cure the inkjet printable paint forming the at least one color layer.

2. The method according to claim 1, wherein steps (c)(ii) and (c)(iii) are practiced simultaneously.

3. The method according to claim 1, wherein step (c)(i) is practiced by treating the basecoat layer with a non-thermal atmospheric pressure plasma.

4. The method according to claim 1, wherein step (a) is practiced by applying the basecoat layer using a second robotic assembly.

5. The method according to claim 1, wherein step (b) is practiced by the steps of:

(b1) mounting the robotic assembly onto an automated guided vehicle (AGV); and (b2) operating the robotic assembly and moving the AGV so as to perform steps (c)(i)-(c)(iii) until the exterior surface of the vehicle is painted.

6. The method according to claim 1, wherein the vehicle is an aircraft.

7. An automated system for painting an exterior surface of a vehicle which comprises:

a robotic coating assembly for applying a base coat to the exterior surface of the vehicle;

a color-printing robotic assembly having an end effector sequentially including a plasma applicator, one or more inkjet printheads and an ultraviolet (UV) light system which are linearly aligned with one another along a pixelation axis; and a controller operably connected to the robotic coating assembly and the color-printing robotic assembly to cause:

(i) the robotic coating assembly to apply a basecoat layer onto the exterior surface of the vehicle;

(ii) the plasma applicator operably associated with the end effector of the color-printing robotic assembly to treat the basecoat layer with a plasma generated by the plasma applicator and form a plasma treated basecoat layer along the pixelation axis;

(iii) at least one color layer to be applied onto the plasma treated basecoat layer by inkjet printing of an ultraviolet (UV) light curable inkjet printable paint along the pixelation axis through operation of the one or more inkjet printheads operably associated with the end effector of the color-printing robotic assembly; and (iv) the at least one color layer along the pixelation axis to be exposed to UV light by operating the UV light system operably associated with the end effector of the color-printing robotic assembly to at least partially cure the inkjet printable paint forming the at least one color layer.

8. The automated system according to claim 7, which further comprises an automated guided vehicle (AGV) operably connected to the controller, wherein at least the color-printing robotic assembly is mounted to and carried by the AGV.

9. The automated system according to claim 7, further comprising:

a painting booth for housing the vehicle, wherein at least one rectilinear track adjacent to the exterior surface of the vehicle, and carriages operably mounted to the rectilinear track, wherein each of the robotic coating assembly and the color-printing robotic assembly is mounted to a respective one of the carriages for rectilinear movements adjacent to the exterior surface of the vehicle.

10. The automated system according to claim 7, wherein the robotic coating assembly comprises a rotatable bell applicator nozzle system.

11. The automated system according to claim 7, wherein the vehicle is an aircraft.

12. The automated system according to claim 11, wherein the exterior surface of the aircraft vehicle is an exterior fuselage surface of the aircraft.

13. A system for applying at least one color layer onto a basecoat layer on an exterior surface of a vehicle, the system comprising a color-printing robotic assembly which comprises an end effector, wherein the end effector includes:

(i) a plasma applicator to generate a plasma and treat and the basecoat layer along a pixelation axis;

(ii) one or more inkjet printheads for application of the at least one color layer onto the plasma treated basecoat layer along the pixelation axis, wherein the at least one color layer is formed of an ultraviolet (UV) curable inkjet printable paint; and (iii) a UV light system operable so as to provide UV light and at least partially cure the UV curable inkjet printable paint applied by the one or more inkjet printheads onto the plasma treated basecoat layer along the pixelation axis, wherein the plasma applicator, the one or more inkjet printheads and the UV light system are sequentially aligned with one another along the pixelation axis.

* * * * *